Feb. 13, 1923.

H. F. DWINALL.
HOT WATER BAG.
FILED JULY 15, 1921.

Inventor
Harold F. Dwinall,
By
Attorney

Feb. 13, 1923.　1,445,501.
H. F. DWINALL.
HOT WATER BAG.
FILED JULY 15, 1921.　2 SHEETS—SHEET 2.

Inventor
Harold F. Dwinall,
By G. Henne Talberti
Attorney

Patented Feb. 13, 1923.

1,445,501

UNITED STATES PATENT OFFICE.

HAROLD F. DWINALL, OF HIGHLAND MILLS, NEW YORK.

HOT-WATER BAG.

Application filed July 15, 1921. Serial No. 484,873.

*To all whom it may concern:*

Be it known that I, HAROLD F. DWINALL, a citizen of the United States of America, residing at Highland Mills, in the county of Orange and State of New York, have invented new and useful Improvements in Hot-Water Bags, of which the following is a specification.

The object of the invention is to provide a hot water bag or bottle with means for producing and maintaining the desired temperature of the liquid contents thereof and of varying the temperature of the liquid to suit the requirements of the treatment which is being applied; and furthermore to provide a heating apparatus for use in connection with hot water bags or bottles which may be readily applied to and used in connection with bottles of the ordinary commercial forms or types; and with this object in view the invention consists in a construction and combination of parts of which a preferred embodiment is shown in the accompanying drawing, wherein:—

The bottle or bag proper as shown at 10 may be of any preferred construction, shape and size having the usual plug socket 11 in the neck portion thereof, said socket, for example, being threaded as indicated for the reception of a plug or stopper 12 to which preferably is attached a heating unit 13 arranged so as to project from the inner end of the plug and thus occupy a position within the bag or bottle when the plug is fitted in place to confine the liquid contents of the bottle.

Figure 1:
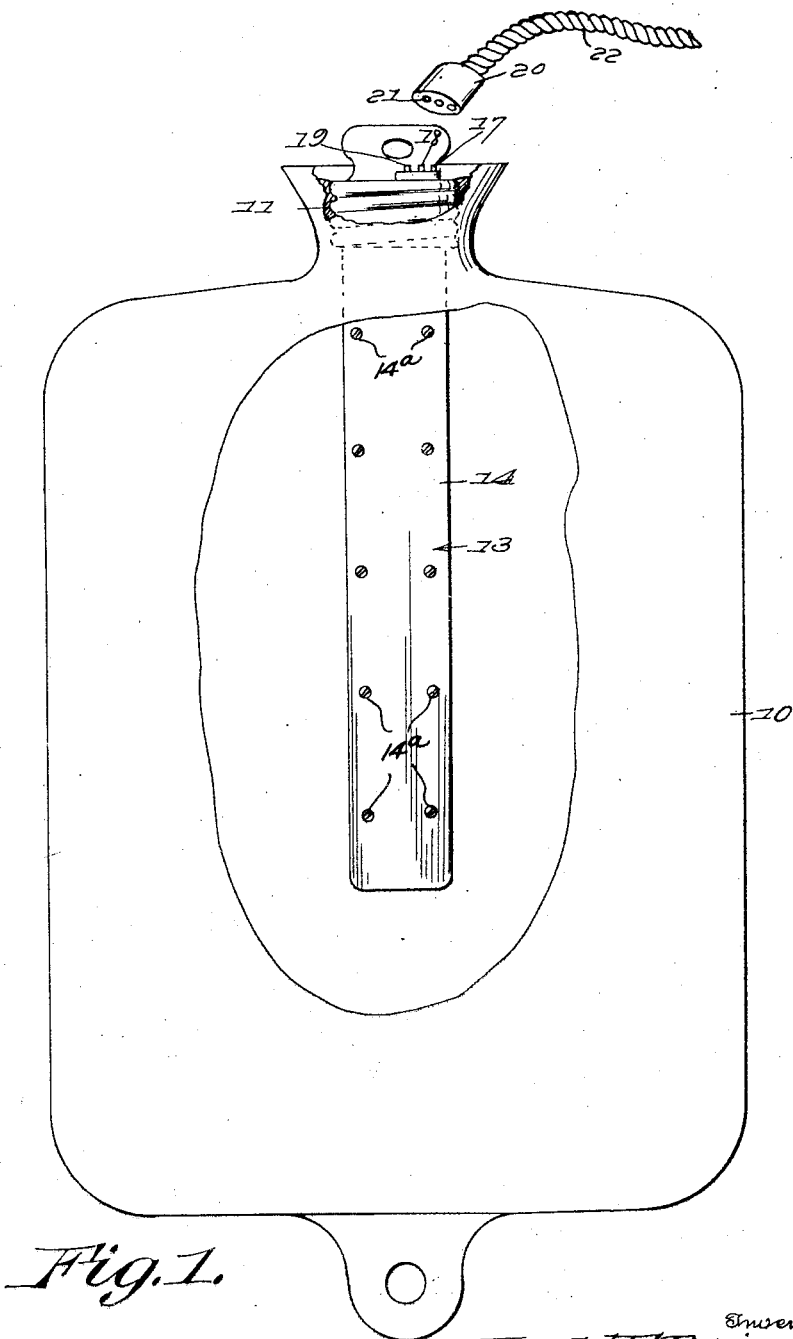
Figure 1 is a side view partly broken away of a hot water bottle provided with a heating device or attachment constructed in accordance with the invention.
Figure 2:
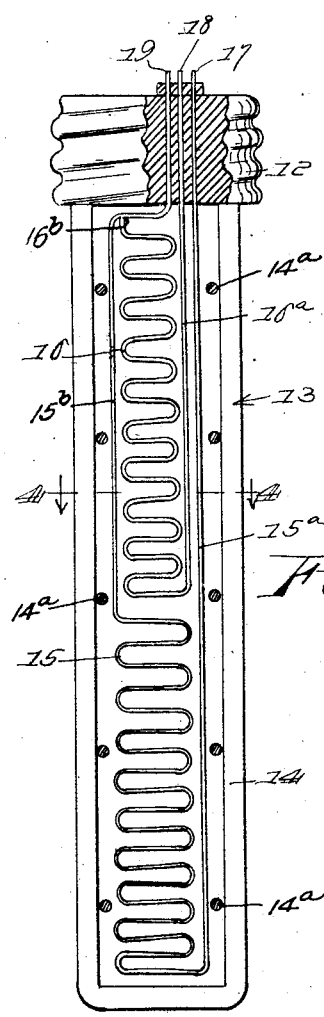
Figure 2 is a longitudinal sectional view of the heating element.
Figure 3:
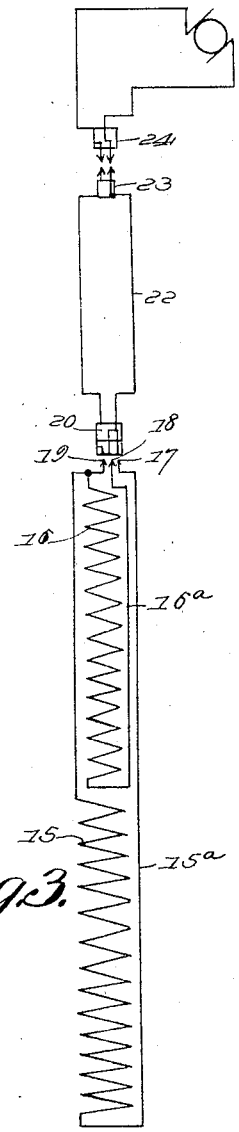
Figure 3 is a detail view in diagram showing the wiring connections and couplings by which the heating capacity of the unit may be modified to suit the requirements of the treatment.
Figure 4:
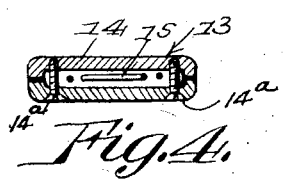
Figure 4 is a section on the line 4—4 of Figure 2.

This heating unit embodies a casing 14 of insulating and preferably non-corrosive material such as mica or the equivalent thereof formed in two complemental sections secured together by screws $14^a$ and constituting a water tight compartment in which is arranged a plurality of heating elements such as the resistance coils 15 and 16, and in order that one or both of these coils may be utilized to modify the temperature of the contents of the bottle the terminals of the conductors $15^a$ and $16^a$ connected respectively with one end of each of the coils are attached to coupling elements such as the plugs 17 and 18 located in a convenient exposed position at the outer end of the stopper 12, while the terminals of the conductors $15^b$ and $16^b$ which are in communication with the opposite ends respectively of said coils are attached to the remaining coupling member 19. It will be thus seen that the coils 15 and 16 are so disposed that they may be placed in series or in parallel or that one of them alone may be placed in circuit. Thus practically three variations of heat are provided, depending on whether the terminals 17 and 18 are placed across the line, or the terminals 17 and 18, or the terminals 18 and 19. The usual duplex flexible cord of course is designed to be used, as indicated diagrammatically at 22 in Figure 3 and as shown in Figure 1, one end of this cord terminating in the plug 20 provided with the sockets 21 for the reception of the coupling members or pins 17, 18 and 19, there being three sockets of which one outside and an intermediate one connect with one side of the line, or one of the conductors of the cord 20 and the remainder with the other outside socket or the other conductor of the cord. The plug 23 is designed for connection to a light socket 24 or other suitable source of supply and if the plug is attached to the coupling members so that the interconnected sockets 21 respectively engage the coupling members 17 and 18 and the remaining outside socket engages the coupling member 19, the spring coils 15 and 16 will be in parallel across the line and the greatest amount of heat thus secured. If the plug is detached and moved laterally so that the intermediate socket engages the plug of the pin 17 and that which promptly engaged the pin 19 engages the pin 18, the two coils will be in series across the line with a reduction in the heat secured. If the plug is turned half way around so that the socket which previously engaged the pin 19 engages the pin 17, so that the interconnected sockets engage respectively the pins 18 and 19, the coil 16 will be short circuited and the coil 15 placed in series across the line with a degree of heat secured possibly greater than when the two coils are in series but obviously less than when both of them are worked in parallel.

While it will be understood that it is not essential or necessary that the heating unit shall be attached to and carried by the plug forming the stopper of the water bottle, it is convenient to so arrange the same as indicated to the end that when the stopper is removed to fill or empty the water bottle the heating unit is displaced and therefore does not obstruct the interior of the receptacle which may consequently be readily cleansed, drained and dried. Moreover the indicated arrangement provides for the use when desire of the water bottle without employing the heating unit, and as the water bottle proper is the only portion of the apparatus which is subjected to material deterioration it may be replaced from time to time without necessitating the renewal or remounting of the heating unit. It is proposed to apply the heating unit to a plug which is of standard size and form adapted for use in connection with any of the commercial types of water bottles, so that the bottle proper may be interchanged without necessitating renewal of the stopper and the attached heating unit.

Having described the invention what is claimed as new and useful is:—

A water bottle having a stopper seat providing access to the interior of the bottle, a stopper removably fitted in said seat and provided with an attached heating unit consisting of a plurality of coils having a common and independent coupling pins, and a socketed plug for engagement with said coupling pins with various combinations of sockets and pins to effect serial or parallel connection of the coils or the independent connection thereof with a source of supply.

In testimony whereof he affixes his signature.

HAROLD F. DWINALL.